United States Patent [19]

Ramsaran et al.

[11] Patent Number: 4,626,628
[45] Date of Patent: Dec. 2, 1986

[54] TELEPHONE LINE CIRCUIT HAVING TIME-SHARED DTMF RECEIVERS

[75] Inventors: Johann D. Ramsaran, Carleton Place; Bora Biray, Nepean; Nadir Nizamuddin; Anthony Yung, both of Calgary, all of Canada

[73] Assignee: Northern Telecom Limited, Montreal, Canada

[21] Appl. No.: 655,128

[22] Filed: Sep. 27, 1984

[51] Int. Cl.⁴ .............................................. H04M 3/00
[52] U.S. Cl. .................................... 379/283; 379/284; 379/290; 379/386
[58] Field of Search ............ 179/84 VF, 18 EB, 18 J, 179/18 FG, 18 FF, 18 E, 18 ES; 340/825.12, 825.13

[56] References Cited

U.S. PATENT DOCUMENTS 3,936,611  2/1976  Poole ........................ 179/84 VF X
4,048,450  9/1977  Bernard et al. ................ 179/18 EB Primary Examiner—James L. Dwyer
Attorney, Agent, or Firm—F. P. Turpin

[57] ABSTRACT

The invention provides a circuit and method for the time-sharing of a DTMF tone receiver. A DTMF receiver has its input terminal connected to a common output terminal of a pair of transmission gates, each gate having an input terminal connected to a respective source of DTMF signals. A control circuit provides switching signals to the transmission gates to cause their input terminals to be connected alternately to the input terminal of the receiver at a predetermined rate until the receiver detects a tone signal on at least one of the input terminals of the gates. The control circuit includes circuitry responsive to the initial tone detection for inhibiting the further generation of switching signals until the tone detection by the receiver has been completed.

16 Claims, 5 Drawing Figures

TELEPHONE LINE CIRCUIT HAVING TIME-SHARED DTMF RECEIVERS

This invention relates generally to line circuits for use in telephone systems and more particularly to a circuit and method for time-sharing a DTMF receiver between a pair of signalling sources.

The use of multifrequency (MF) or dual-tone multifrequency (DTMF) signalling in telephone systems is very well known. Such signals are employed, for example, as station calling signals by subscribers equipped with pushbutton telephone subsets. The coded signal comprises selected combinations of coincident two-tone bursts, and each combination comprises one tone from a relatively high-frequency band and one from a relatively low-frequency band. An illustrative system employing multifrequency coded signals is fully described in the January 1960 issue of the Bell System Technical Journal, 39 BSTJ 235.

In a telephone system employing such signalling, the central office equipment or private business exchange (PBX) core equipment includes a receiver which converts each tone pair into DC or digital signals. Appropriate combinations of these signals are used conventionally to initiate the operation of the common equipment at the central office, PBX, or electronic key system. Such a system is described in an article entitled "Vantage 48: a key system with PBX features", Telesis 1983, one, at 18.

In telephone systems adapted to operate with pushbutton telephone sets, a pool of DTMF receivers are available for use by the subscribers. When a subscriber requests service such as by going off-hook, a receiver is attached to his line for reception of the tones. On completion of the signalling, the receiver is disconnected from the line and is returned to the pool. Of course, DTMF receivers are pooled because they tend to be costly and the provision of a one-to-one ratio of receivers to subscriber sets would be prohibitively expensive. On the other hand, the pooling of receivers sometimes contributes to blocking within the system; this occurs when the number of subscribers wishing to use their signalling system exceeds the number of receivers available.

The invention alleviates these difficulties by providing a circuit and a method for the time-sharing of a DTMF receiver by a pair of subscriber sets whereby the signalling originated by both subscribers is effectively monitored continuously.

In accordance with the invention, a circuit for the time-sharing of a DTMF receiver comprises a control circuit which includes means for generating timing signals. A DTMF receiver has an input terminal for receiving analog signals and an output terminal for providing output signals representative of the identity of the input signals. First and second terminals are adapted for connection to respective sources of DTMF signals. A pair of transmission gates are responsive to switching signals from the timing generator for alternately connecting the first and second terminals to the input terminal of the DTMF receiver whereby the signalling appearing on the first and the second terminals is effectively monitored continuously.

The invention is embodied in a line circuit having a pair of DTMF receivers each adapted to receive DTMF signalling tones from a respective pair of subscriber lines. The line circuit comprises a microprocessor control circuit for switching a pair of multiplexer circuits and thus control access of the receivers to the subscriber lines in accordance with a preset procedure controlled by the microprocessor. Each receiver is switched between a respective pair of subscriber lines at a predetermined rate until an incoming tone is detected on at least one of the subscriber lines. In that instance, DTMF detection of the incoming tone on the connected subscriber lines is completed before the switching of the receivers to the other pair of subscriber lines is resumed. In effect, the scanning of the subscriber lines is frozen when a DTMF tone is detected on one of them and is resumed when the tone detection is complete.

By having to provide only one DTMF receiver per pair of subscriber lines whereby each line is effectively monitored continuously, it becomes economically possible to provide non-blocking service to every subscriber.

An example embodiment of the invention will now be described in conjunction with the drawings in which.

Figure 1:
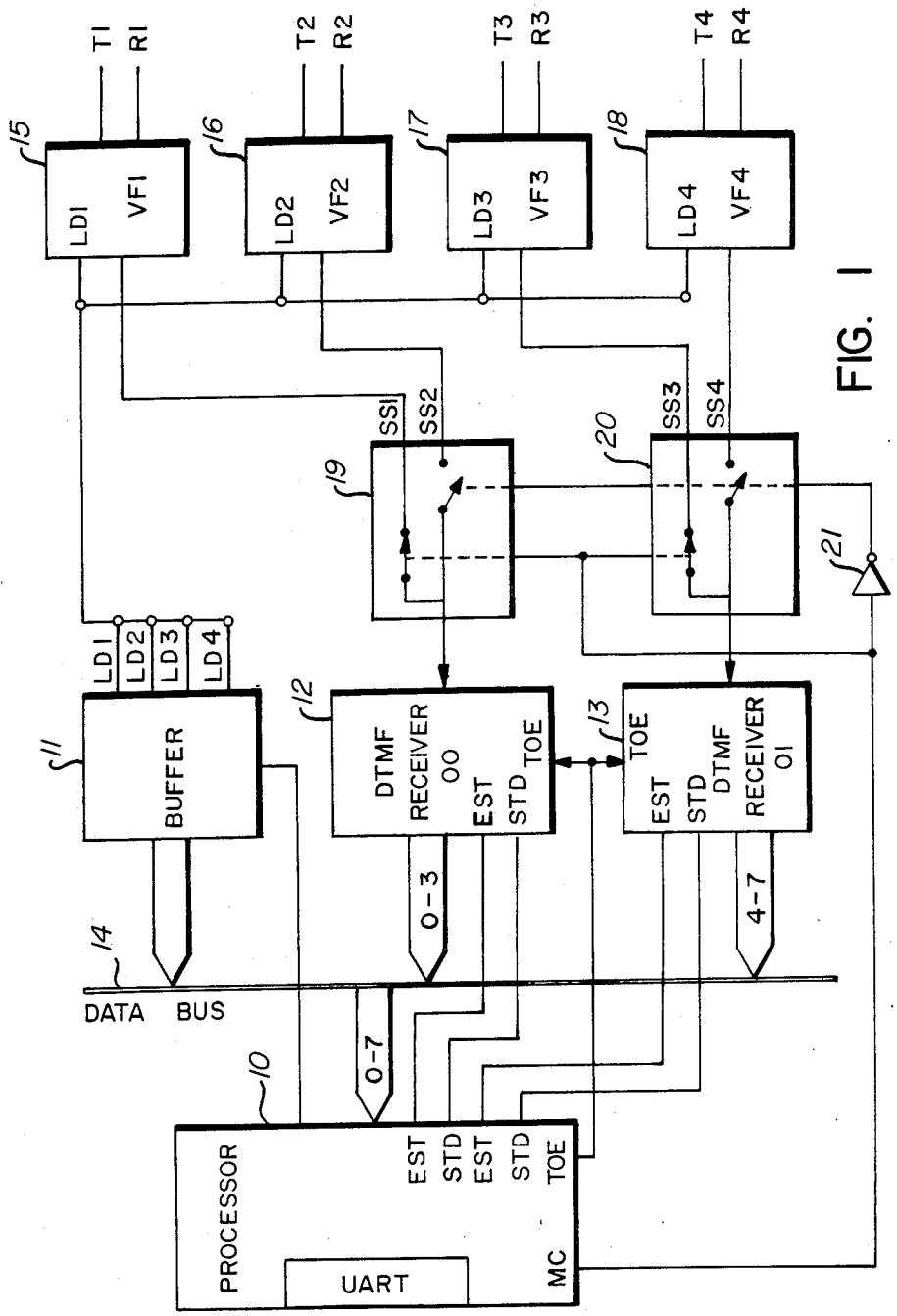
FIG. 1 is a block schematic diagram of a circuit in accordance with the invention.

FIG. 1 illustrates a portion of a line circuit embodying the invention. A processor 10 is shown connected to a buffer circuit 11 and a pair of DTMF receivers 12 and 13 via a data bus 14. The receivers 12 and 13 are connected to four voice frequency circuits 15 to 18 through a pair of multiplexer circuits 19 and 20 which are controlled by a signal MC from the processor 10 and by its complementary signal $\overline{MC}$ generated at the output of an inverter gate 21.

The voice frequency interface circuits 15 to 18 are adapted to be connected to respective subscriber loops. Each interface circuit comprises a line coupling transformer with the primary connected to the tip and ring pair of a subscriber loop. The secondary windings are respectively connected to input terminals of the multiplexer circuits 19 and 20 and are identified as SS1, SS2, SS3 and SS4. The interface circuits 15-18 perform the usual functions of battery feed to the tip and ring terminals, loop current detection, D.C. flux cancellation in the line transformer, and ring voltage transfer and ring trip.

The control logic hardware for the line circuit centers around the microprocessor 10 which may conveniently be an off-the-shelf unit such as model number 8749 which is equipped with read-only-memory and random-access-memory capability on the same chip. The processor 10 provides a UART (universal asynchronous receiver/transmitter) function for the four links and controls the functions of the line circuit such as loop detection, dial pulse and hook-switch flash decoding for four lines, ring relay control with zero crossing synchronization and ring trip detection for the four lines as well as DTMF receiver control and decoding. The processor obtains the information necessary to the loop detection decoding function via leads LD1, LD2, LD3 and LD4 from the interface circuits which are buffered to the data bus 14 by the circuit 11 which may also conveniently be component number 74LS244.

Each of DTMF receivers 12 and 13 actually represents the combination of a DTMF filter—for example model number 8865—and a DTMF detector—for example, model number 8860. The function of the filter is to separate the high group and low group components of the composite dual tone signal and limit the resulting pair of sinewave signals to produce rectangular wave signals having the same frequencies as the individual components of the composite DTMF input. The high group and low group rectangular waves are applied to the detector circuit which operates thereon to determine the frequencies of the incoming tones and verify that they correspond to standard DTMF frequencies. When both high group and low group signals have been simultaneously detected, a flag EST (early-strobe signal) is generated. Internally to the detector, the presence of the EST flag allows the control/discriminator to identify the detected tones to the code converter which in turn presents a four-bit binary code word corresponding to the received tone signal to an output latch. When the latches are set, an StD flag is generated to indicate that the data may be read out by enabling the TOE input of the receiver. The time period between reception of the DTMF signals and generation of the StD flag is termed the "time to receive" and is adjustable with external components. Increasing the time to receive tends to improve the talk off performance of the receiver but degrades the response time of detection upon simultaneous incoming signals on the two lines.

The multiplexer circuits 19 and 20 may conveniently be an off-the-shelf commercial component such as the quad multiplexer component number 14066B. Each half of the package provides a pair of transmission gates having their output terminals connected together and to the input terminal of a respective one of receivers 12 and 13. Each pair of gates is adapted to pass analog signals from one or the other of a pair of input terminals to their output terminal. Both pairs of gates are driven from the same signals MC and $\overline{MC}$ and respond thereto by connecting either of SS1 and SS3 or SS2 and SS4 to their respective DTMF receivers 12 and 13.

Figure 2:
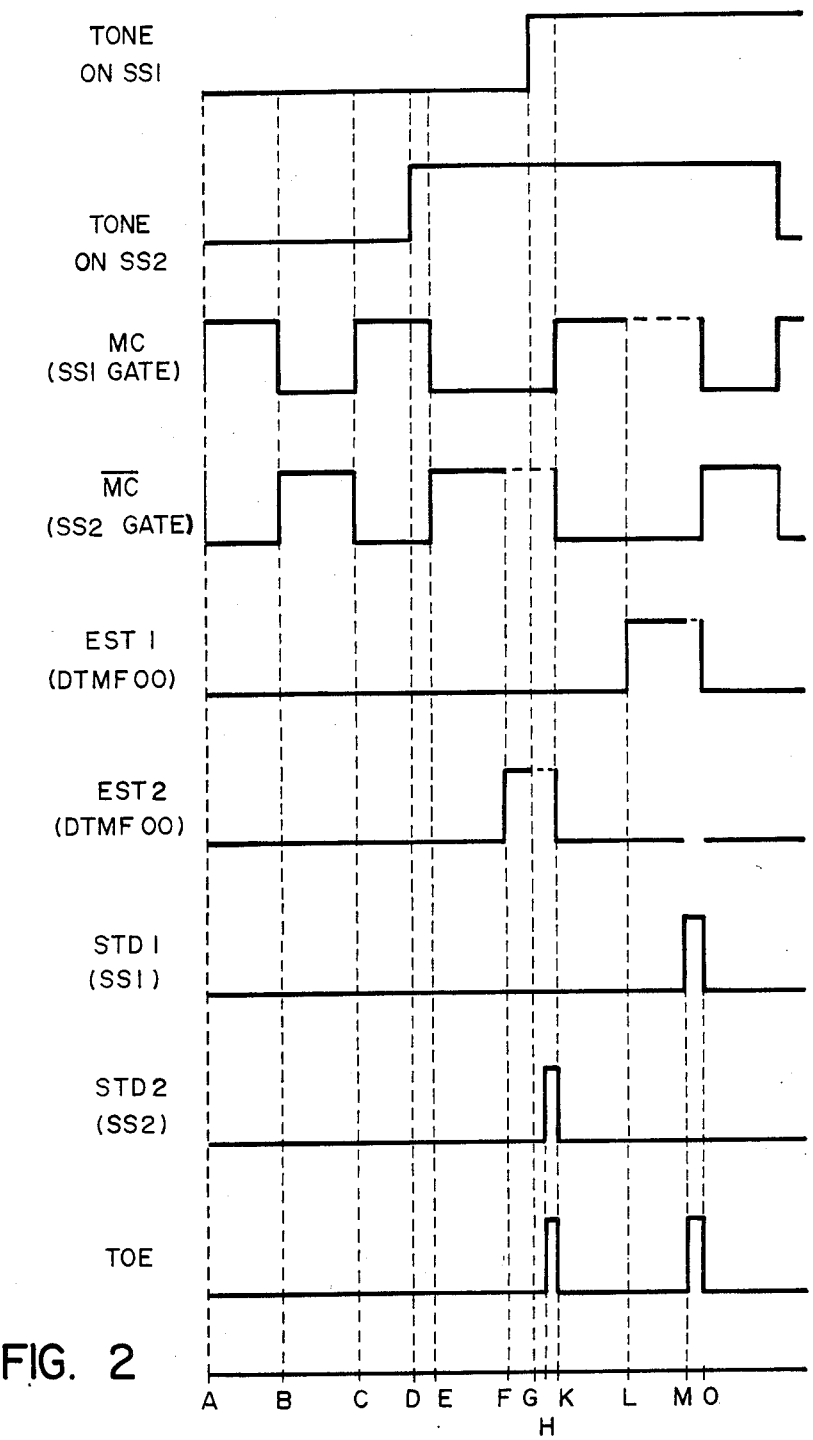
FIG. 2 is a timing diagram illustrating the waveforms at various locations in FIG. 1.
Figure 3A:
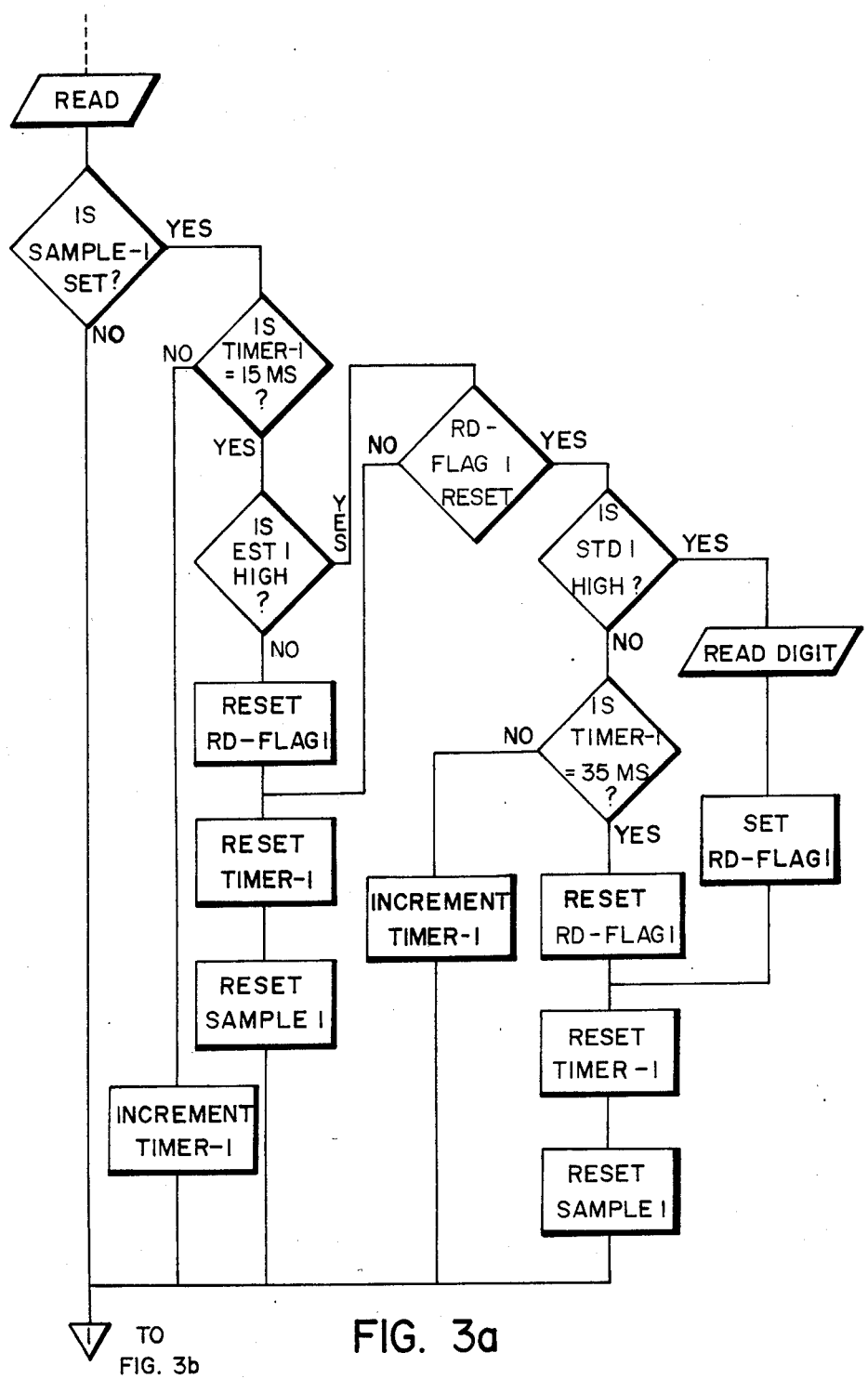
FIGS. 3a, 3b and 3c form a composite flow chart depicting the microprocessor instructions necessary to control the circuit of FIG. 1.
Figure 3B:
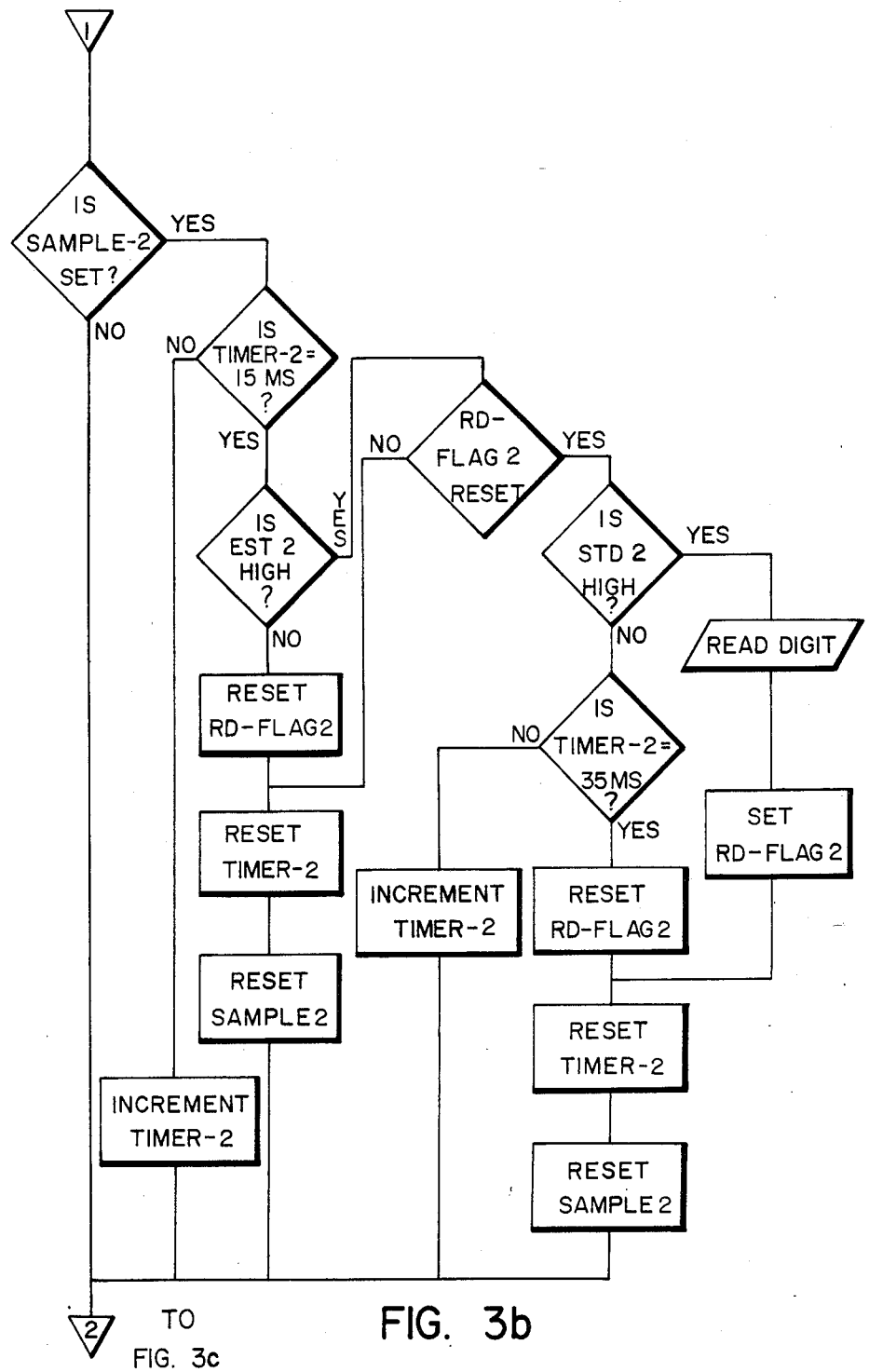
Figure 3C:
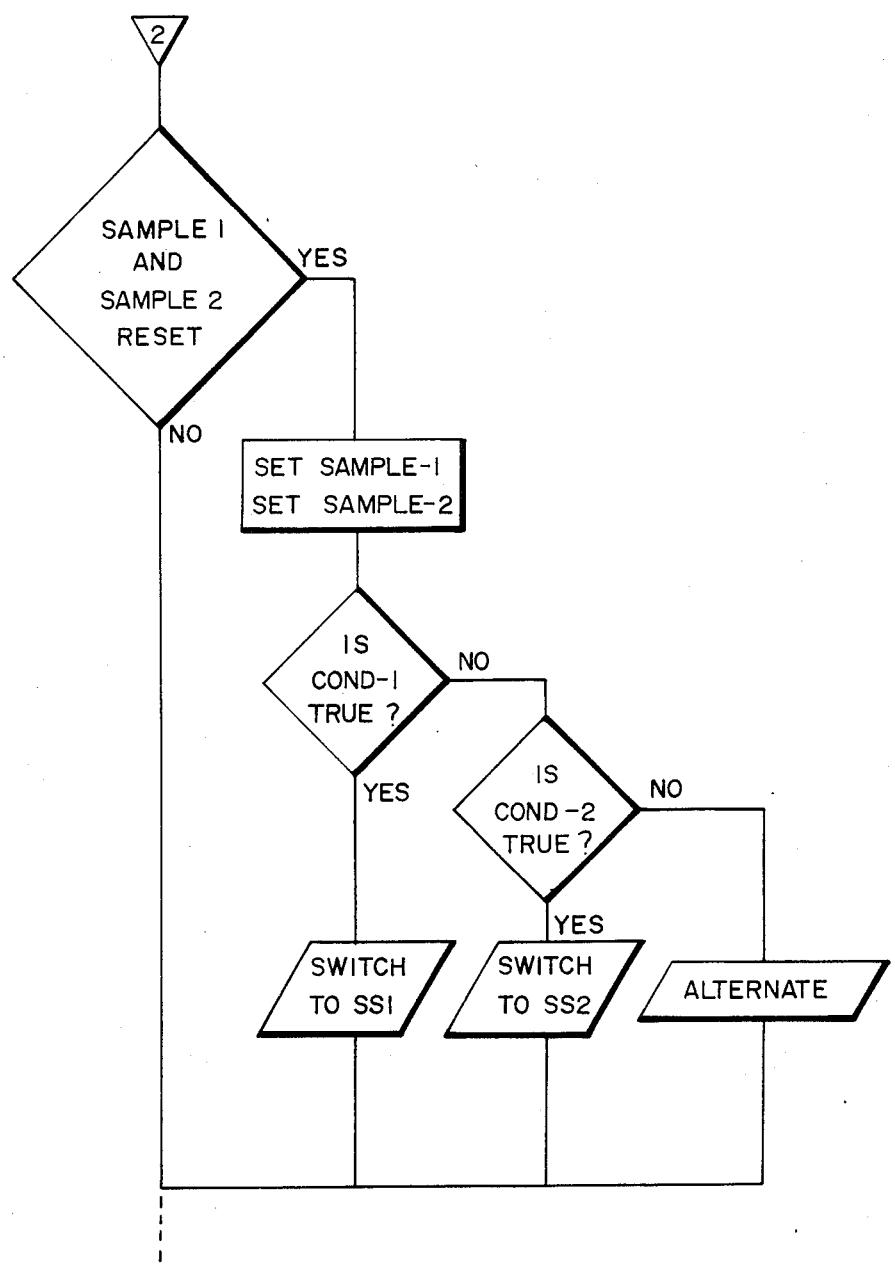

The operation of the circuit may be better understood by gaining a full appreciation of the waveform illustrations of FIG. 2 and the flow chart of FIGS. 3a, 3b and 3c. Since the pair of receivers 12 and 13 and their associated multiplexing circuit operate in exactly the same way, the description of the operation will be limited to the time-sharing operation of receiver 12 between sources of DTMF signals SS1 and SS2.

The first two waveforms of FIG. 2 illustrate the tone bursts on SS1 and SS2 input terminals; these are nominally 70 ms. During the periods AB, BC, CE, the multiplexer circuit 19 is causing the input of the receiver 12 to be connected alternately between the input terminals SS1 and SS2 at a predetermined rate of 15 milliseconds on and off. At point D, a tone is present on SS2 but the SS2 gate is low (not made) and the receiver 12 does not respond.

At time F, the tone SS2 has been connected to the input of the receiver 12 for 15 ms. and the latter responds by generating an early strobe signal EST2 which causes the scanning process of the input terminals to be frozen until the detection or reception of the SS2 tone is complete. This is acknowledged to be complete when the binary data corresponding to the tone has been received by the processor. At time G, the tone on SS1 arrives but without consequence since the scanning process is frozen and gate SS1 is not connected. At time H, the receiver generates the strobe data signal StD2 which causes the processor 10 to generate the TOE signal to cause the binary data corresponding to the tone on SS2 to be transferred to the processor 10 via the data bus 14.

At time K, the switching of the gates is resumed and this time, the tone SS1 is received by the receiver 12 at time L and its corresponding code read between times M and O. It may be noted that each receiver only generates one EST signal and one StD signal. The EST1, EST2, StD1, StD2 etc., signals are recognized by the processor because it internally associates the receiver with the scanning clock. For example, the flow chart at FIGS. 3a and 3b shows timer-1 and timer-2 each one being associated with a respective process.

The flow charts of FIGS. 3a and 3b illustrate graphically the operation just described. The Sample flag shown in the charts is used to indicate the status of the tone being received. When the Sample flag is set, it means that the tone has not been received by the receiver for 15 ms. When the Sample flag is reset, it means that no more action by the circuitry is required for the tone. The RD-Flag is used to indicate that the data associated with a particular tone has been read. These flow charts also depict the logical sequence associated with false detection of an analog signal by a receiver. The erroneous analog signal causes the EST flag to be raised but since it is not proper DTMF signalling, the receiver does not generate the StD flag. Therefore, in the instance where the EST flag has been raised and the StD flag has not been generated within a predetermined period of time (in this case 35 ms.), it is assumed that the detected tone signal was improper and the detection process is terminated by resetting the RD-Flag, the Timer, and the Sample flag for that process.

The flow chart of FIG. 3c illustrates the process that the processor follows in determining whether or not the alternate switching between the two pairs of gates should take place. If terminals SS1 and SS3 are being scanned and the telephone lines associated with terminals SS2 and SS4 are inactive, that is, they are not requesting service, then switching to those terminals will be inhibited. The conditions under which the switching will or will not take place is defined by the flow chart and the following definitions: COND-1=(SS1 or SS3 OFF HOOK) and (SS2 and SS4 ON HOOK), and COND-2=(SS2 or SS4 OFF HOOK) and (SS1 and SS3 ON HOOK).

As mentioned earlier, the nominal duration of a DTMF tone burst is usually about seventy milliseconds. It is possible under extreme conditions that the detection of a digit may be missed by the circuitry of the invention. For this to happen, the pair of signals being time-shared by one receiver would have to occur simultaneously, be of a duration considerably shorter than normal, and the tolerance of the receiver circuitry would possibly need to be at the long end of its range. A statistical analysis indicates that the probability of these factors combining in a single circuit is very low and certainly no greater than the probability of non-detection of a digit for reasons not associated with the line circuit of the invention. As mentioned earlier, the capability of detecting shorter bursts of tones may be enhanced by decreasing the guard time of the DTMF receiver; however, decreasing the guard time is done at the expense of talk off performance.

The time-sharing circuit and method of the invention provides a line circuit which is practical and which makes it economical to offer non-blocking DTMF monitoring service to the subscribers of a telephone system.

What is claimed is:

1. A circuit for time-sharing a DTMF tone receiver comprising:
   a DTMF receiver having an input terminal for receiving a sequence of tone signals and an output terminal for providing output signals representative of the identity of the sequence of tone input signals,
   a pair of transmission gates having their output terminals connected together to the input terminal of the receiver and their input terminals respectively connected to the first and second terminals;
   a control circuit including means for generating timing signals, the control circuit providing switching signals to the transmission gates to cause each of the first and second terminals to be connected alternately to the input terminal of the receiver at a predetermined rate until the receiver detects an individual tone signal of the sequence of tone signals on at least one of the first and second terminals, the control circuit including means responsive to said initial detection for inhibiting the further generation of switching signals until the individual tone detection by the receiver has been completed.

2. A circuit as defined in claim 1 wherein the control circuit comprises a suitably programmed microprocessor.

3. A circuit as defined in claim 2 wherein initial tone detection is achieved by recognizing a change of state in the early-strobe signal of the receiver.

4. A circuit as defined in claim 3 wherein tone detection is acknowledged to be complete only when the early-strobe signal has changed state for at least a predetermined period of time, the strobe-data signal of the receiver has also changed state, and the output signal from the receiver has been latched.

5. A circuit as defined in claim 4 wherein the control circuit further includes means for terminating the tone detection process by the receiver when, subsequent to the initial detection of an individual tone by the receiver, the strobe-data signal of the receiver has not changed state within a predetermined period of time.

6. A telephone line circuit comprising a pair of DTMF receivers for time-sharing the reception of a sequence of DTMF signaling tones from a respective pair of subscriber lines, comprising:
   a pair of multiplexer circuits each one having an output terminal adapted to be switched between one and the other of a pair of input terminals, the two pairs of input terminals being for connection to respective sources of DTMF signals;
   a control circuit for controlling the line circuit and for generating timing signals, the control circuit providing switching signals to the multiplexer circuits thereby to cause the receivers to be connected alternately between a respective pair of input terminals at a predetermined rate until one of the receivers detects an individual tone signal of the sequence of tones on at least one of the input terminals, the control circuit including means responsive to said initial detection for inhibiting the further generation of the switching signals until the individual tone detection has been completed.

7. A telephone line circuit as defined in claim 6 wherein the control circuit comprises a suitably programmed microprocessor.

8. A telephone line circuit as defined in claim 7 wherein the initial individual tone detection by a receiver is achieved by recognizing a change of state in the early-strobe signal of that receiver.

9. A telephone line circuit as defined in claim 8 wherein tone detection is considered complete only when the early-strobe signal has changed state for at least a predetermined period of time, the strobe-data signal of that receiver has also changed state, and the data at the output signal of the receiver has been latched.

10. A telephone line circuit as defined in claim 9 wherein the control circuit further includes means for terminating the tone detection process by a receiver when, subsequent to the initial detection of an individual tone by the receiver, the strobe-data signal of that receiver has not changed state within a predetermined period of time.

11. A telephone line circuit as defined in claim 7 wherein the control circuit also includes means for inhibiting the generation of switching signals to the multiplexer circuits when the signal level at the input terminals connected to the subscriber lines indicate that the subscriber lines not presently connected to the receivers are inactive.

12. In a telephone line circuit comprising at least one DTMF receiver and a pair of transmission gates for connecting the receiver to a pair of input terminals connectable to respective sources of a sequence of DTMF signals, a method of time-sharing the DTMF receiver between the pair of input terminals, comprising the steps of:
   switching the transmission gates between the input terminals so that the receiver is connected alternately between the pair of input terminals at a predetermined rate,
   inhibiting the switching between the input terminals when the receiver detects an individual tone signal of the sequence of tone signals on at least one of the input terminals,
   validating the detected tone signal, and
   resuming the switching between input terminals.

13. A method as defined in claim 12 wherein the individual tone signal detection is achieved by recognizing a change of state in the early-strobe signal of the receiver.

14. A method as defined in claim 13 wherein the validating step comprises the steps of recognizing a change of state in the early-strobe signal for at least a predetermined period of time and also recognizing a change of state of the strobe-data signal of the receiver.

15. A method as defined in claim 14 and comprising the further step of terminating the tone detection process by the receiver when, subsequent to an initial detection of an individual tone, the strobe-data signal of the receiver has not changed state within a predetermined period of time.

16. A method as defined in claim 15 and comprising the further step of inhibiting the generation of switching signals to the transmission gates when the signal level at the input terminals indicate that the subscriber line not presently connected to the receiver is inactive.

* * * * *